United States Patent
Jin

(10) Patent No.: US 8,275,291 B2
(45) Date of Patent: Sep. 25, 2012

(54) DRIVING-TRANSMITTER AND PROCESS CARTRIDGE

(75) Inventor: Benyou Jin, Guangdong (CN)

(73) Assignee: Print-Rite Technology Development Co., Ltd. of Zhuhai, Guangdong (CN)

( * ) Notice: Subject to any disclaimer, the term of this patent is extended or adjusted under 35 U.S.C. 154(b) by 355 days.

(21) Appl. No.: 12/673,359

(22) PCT Filed: May 30, 2008

(86) PCT No.: PCT/CN2008/071145
§ 371 (c)(1),
(2), (4) Date: Feb. 12, 2010

(87) PCT Pub. No.: WO2009/024033
PCT Pub. Date: Feb. 26, 2009

(65) Prior Publication Data
US 2010/0196047 A1     Aug. 5, 2010

(30) Foreign Application Priority Data
Aug. 23, 2007   (CN) ...................... 2007 2 0056212 U

(51) Int. Cl.
*G03G 15/00*     (2006.01)

(52) U.S. Cl. ..................................................... 399/167
(58) Field of Classification Search .................. 399/36, 399/167; 464/182
See application file for complete search history.

(56) References Cited

U.S. PATENT DOCUMENTS
7,813,676 B2 * 10/2010 Huck et al. .................... 399/167

FOREIGN PATENT DOCUMENTS
CN     1752473     3/2006
JP     2004-108481     4/2004

* cited by examiner

*Primary Examiner* — David Gray
*Assistant Examiner* — Gregory H Curran
(74) *Attorney, Agent, or Firm* — Cozen O'Connor

(57) ABSTRACT

A driving-force transmitter and a process cartridge. The process cartridge has a photosensitive drum and the driving-force transmitter mounted on the end of the photosensitive drum. The driving-force transmitter having a fitting part and multiple protrusions protruding from an end surface of the fitting part. The multiple protrusions are distributed equiangularly on a circle which is in the end surface of the fitting part. The center of the circle is on the axis of the fitting part. There is an engaging-part on the farthest end of each protrusion from the axis of the fitting part. An anti-separating groove is provided on the engaging-part.

12 Claims, 7 Drawing Sheets

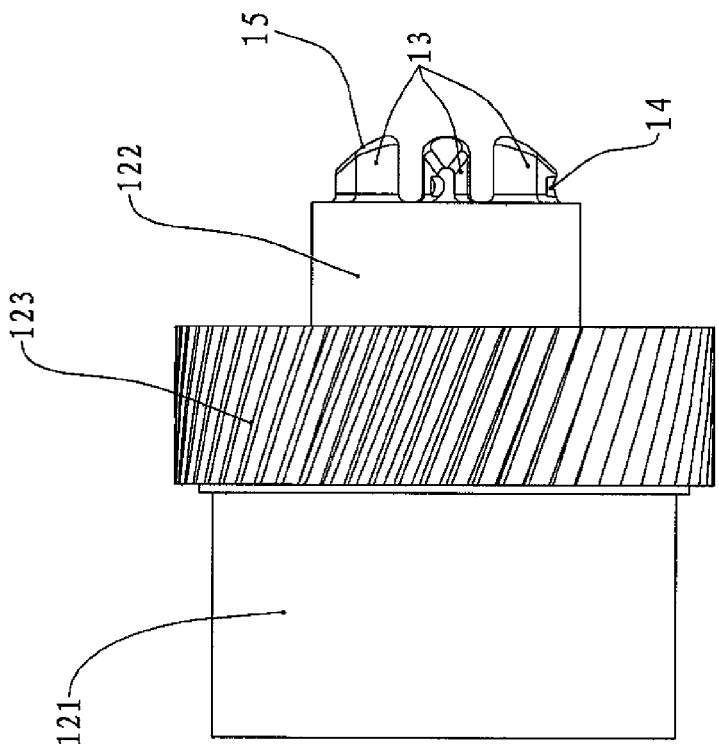
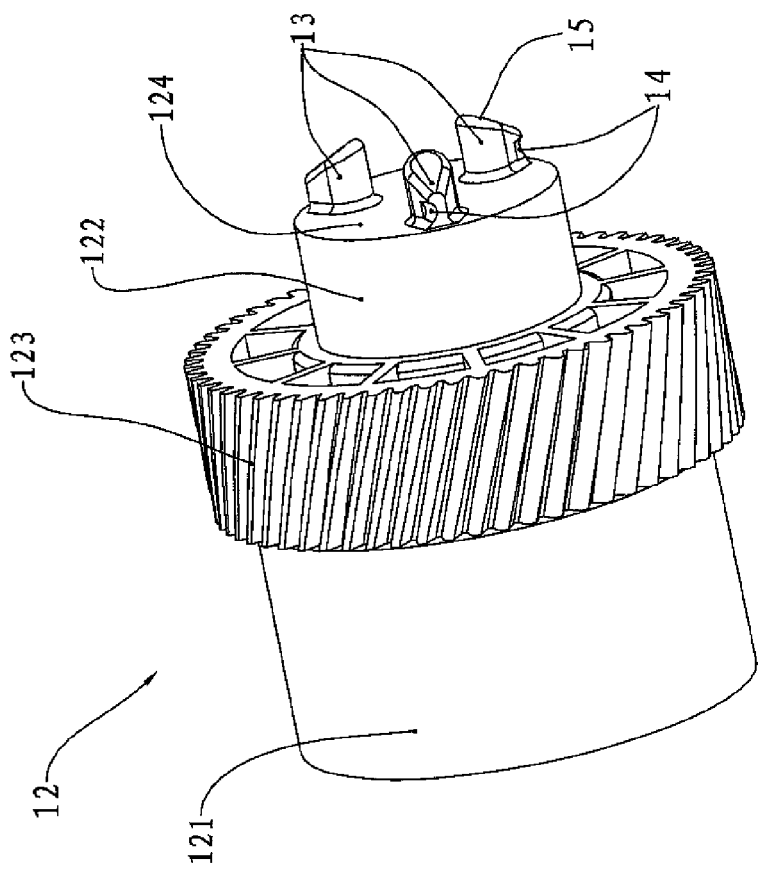

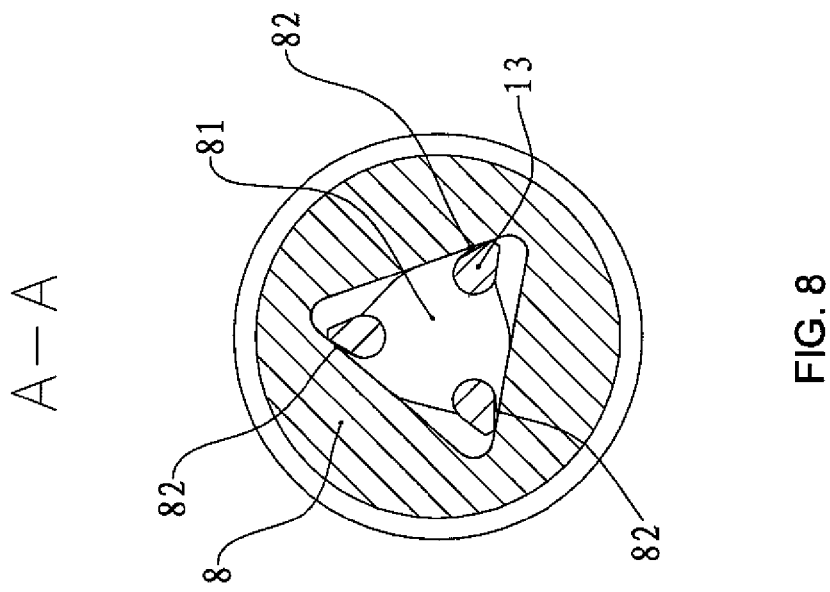
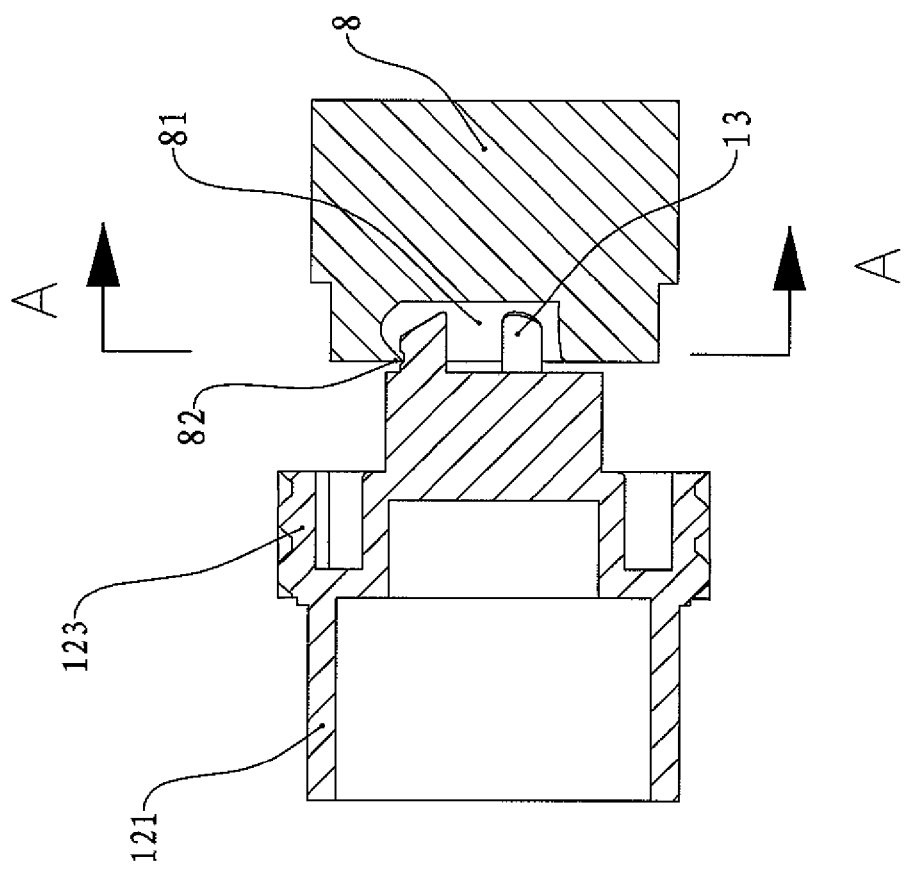
FIG. 7
FIG. 8

DRIVING-TRANSMITTER AND PROCESS CARTRIDGE

PRIORITY CLAIM

This is a U.S. national stage of application No. PCT/CN2008/071145, filed on May 30, 2008. Priority is claimed on the following application: China Application No.: 200720056212.7 Filed on Aug. 23, 2007, the content of which is incorporated here by reference.

FIELD OF THE INVENTION

The present invention relates to a driving-force transmitter and a process cartridge provided with the driving-force transmitter, especially to a driving-force transmitter used in an electronic imaging device for receiving and transmitting driving force and a process cartridge that uses the driving-force transmitter.

BACKGROUND OF THE INVENTION

In an electronic imaging device such as a laser printer, a laser photocopiers, a facsimile apparatus, etc., a process cartridge is normally installed detachably, which is used for developing electro-static latent image and comprised at least of one or more components of developing roller, photosensitive drum, toner feeding roller, agitator, doctor blade and charging roller. During operation of the electronic imaging device, printing operation is realized by driving the corresponding components in the process cartridge.

There are two major driving methods at present for the process cartridge. In one method, as disclosed in U.S. Pat. No. 4,829,335, a spiral gear provided in the driving part of the printer is engaged with a spiral gear as a driving-force transmitter provided at one end of the photosensitive drum, by which the photosensitive drum is rotated. In the other method, as disclosed in Chinese patent of invention No. CN1217241C, a non-twisted protrusion as a driving-force transmitter protruding from one end of the photosensitive drum is engaged with a coupling twisted hole provided in the driving part of the printer to receive and transmit the driving force, by which the photosensitive drum is rotated.

In the second method, under the action of torque, transmission between the non-twisted protrusion at the end of the photosensitive drum and the coupling twisted hole in the driving part generates an axial force which separates them from each other along the axial direction, effect the fit quality between the twisted hole in the driving part and the non-twisted protrusion from the photosensitive drum, decrease transmission stability and reliability as well as printing quality; with the increasing of operating time, interrupt the torque transmission by accidental disengagement between the driving part and the photosensitive drum.

SUMMARY OF THE INVENTION

The first object of the present invention is to provide a driving-force transmitter which is reliable in receiving and transmitting driving force.

The second object of the present invention is to provide a process cartridge which is reliable in receiving and transmitting driving force.

According to an aspect of the present invention, a driving-force transmitter is provided which comprises a fitting part and a plurality of protrusions protruding from an end surface of the fitting part, which are distributed equiangularly on a circle in the end surface of the fitting part, the center of the circle is on the axis of the fitting part; an engaging-part formed by curved convex surface is provided at the farthest end of each said protrusion from the axis of the fitting part, each engaging-part has an open-ended anti-separating groove.

An embodiment involves three protrusions, connecting lines of which form a triangle.

According to another aspect of the present invention, a driving-force transmitter is provided which comprises a fitting part revolving about its own axis and a plurality of protrusions protruding from an end surface of the fitting part, each protrusion is provided with an anti-separating groove on the side surface against the axis of the fitting part, each groove is substantially perpendicular to the axis of the fitting part.

An embodiment involves three protrusions, connecting lines of which form a triangle, in addition, front ends of which can be designed as guiding surfaces.

According to another aspect of the present invention, a process cartridge is provided which comprises a photosensitive drum located longitudinally in between the side walls of the process cartridge, with a longitudinal end of the photosensitive drum extending out of the side wall of the process cartridge. At the longitudinal end of the photosensitive drum extending out of the side wall of the process cartridge is provided with a driving-force transmitter, which comprises a fitting part and a plurality of protrusions protruding from an end surface of the fitting part, which are distributed equiangularly on a circle in the end surface of the fitting part, the center of the circle is on the axis of the fitting part; an engaging-part formed by curved convex surface is provided at the farthest end of each said protrusion from the axis of the fitting part, each engaging-part has an open-ended anti-separating groove.

According to another aspect of the present invention, a process cartridge is provided which comprises a photosensitive drum located longitudinally in between the side walls of the process cartridge, with a longitudinal end of the photosensitive drum extending out of the side wall of the process cartridge. At the longitudinal end of the photosensitive drum extending out of the side wall of the process cartridge is provided with a driving-force transmitter, which comprises a fitting part revolving about its own axis and a plurality of protrusions protruding from an end surface of the fitting part, each protrusion is provided with an anti-separating groove on the side surface against the axis of the fitting part, each groove is substantially perpendicular to the axis of the fitting part.

An embodiment involves three protrusions, connecting lines of which form a triangle, in addition, front ends of which can be designed as guiding surfaces.

BRIEF DESCRIPTION OF THE DRAWINGS

FIG. 4 is a perspective view of a driving-force transmitter according to the second embodiment of the present invention;

FIG. 5 is a front view of the driving-force transmitter shown in FIG. 4;

FIG. 7 is a schematic diagram, illustrating the engaging relationship between the driving-force transmitter and the driving part shown in FIG. 4;

FIG. 8 is a sectional view taken along line A-A of FIG. 7;

DESCRIPTION OF THE PREFERRED EMBODIMENTS

Embodiments of the present invention will be described in conjunction with the accompanying drawings.

Embodiment 1

Figure 1:
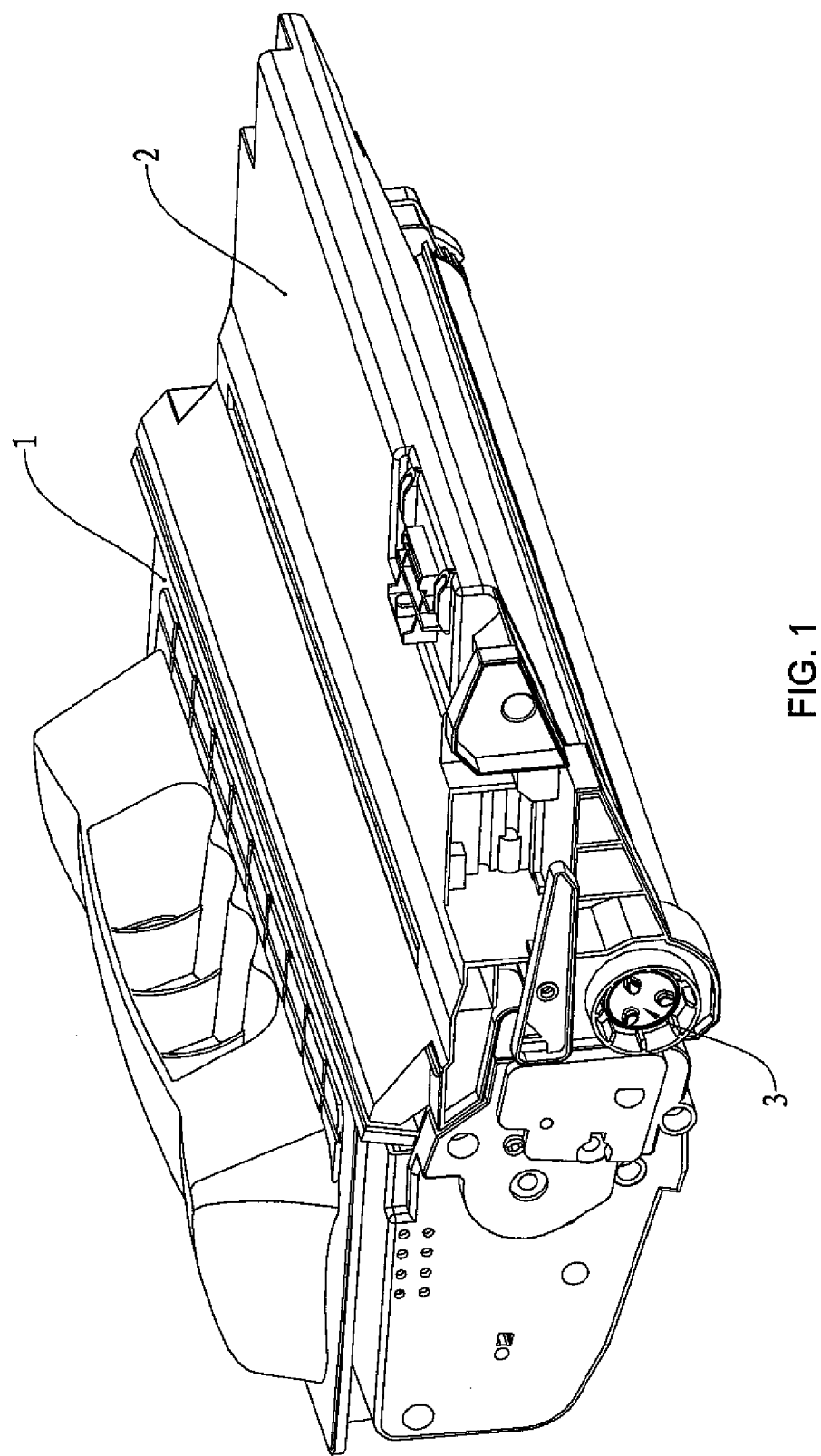
FIG. 1 is a perspective view of a process cartridge according to the first embodiment of the present invention.

The embodiment is a process cartridge according to the present invention. Referring to FIG. 1, the process cartridge comprises a toner frame 1 for accommodating toner and a waste toner frame 2 for collecting waste toner, which are interconnected with each other with pins or other connecting means and have similar structure to the traditional ones, with an agitator, toner feeding roller and developing roller, etc. accommodated in the toner frame 1 and photosensitive drum, charging roller and cleaning blade, etc. in the waste toner frame 2 respectively.

Figure 2:
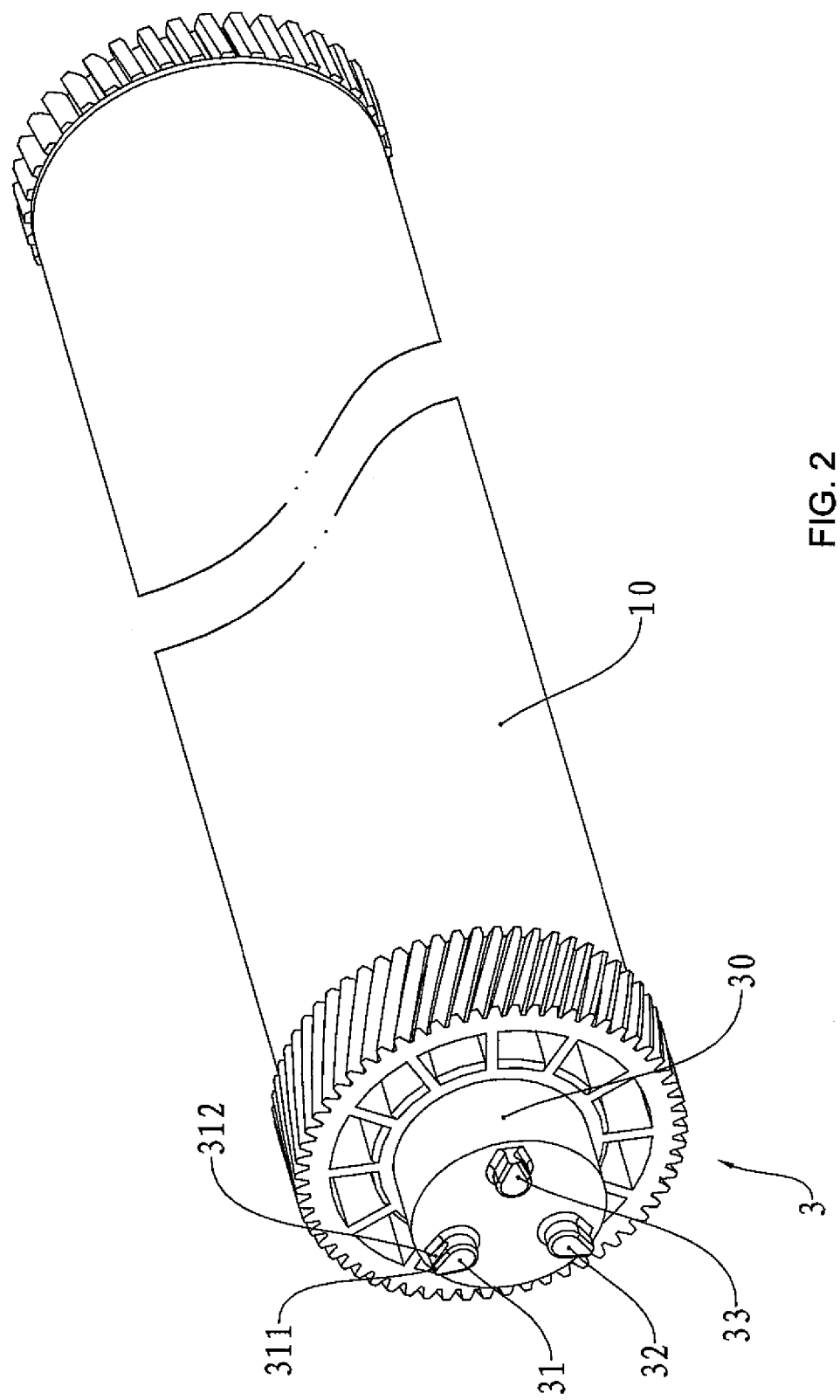
FIG. 2 is a schematic diagram of a photosensitive drum with a driving-force transmitter according to the first embodiment of the present invention.
Figure 3:
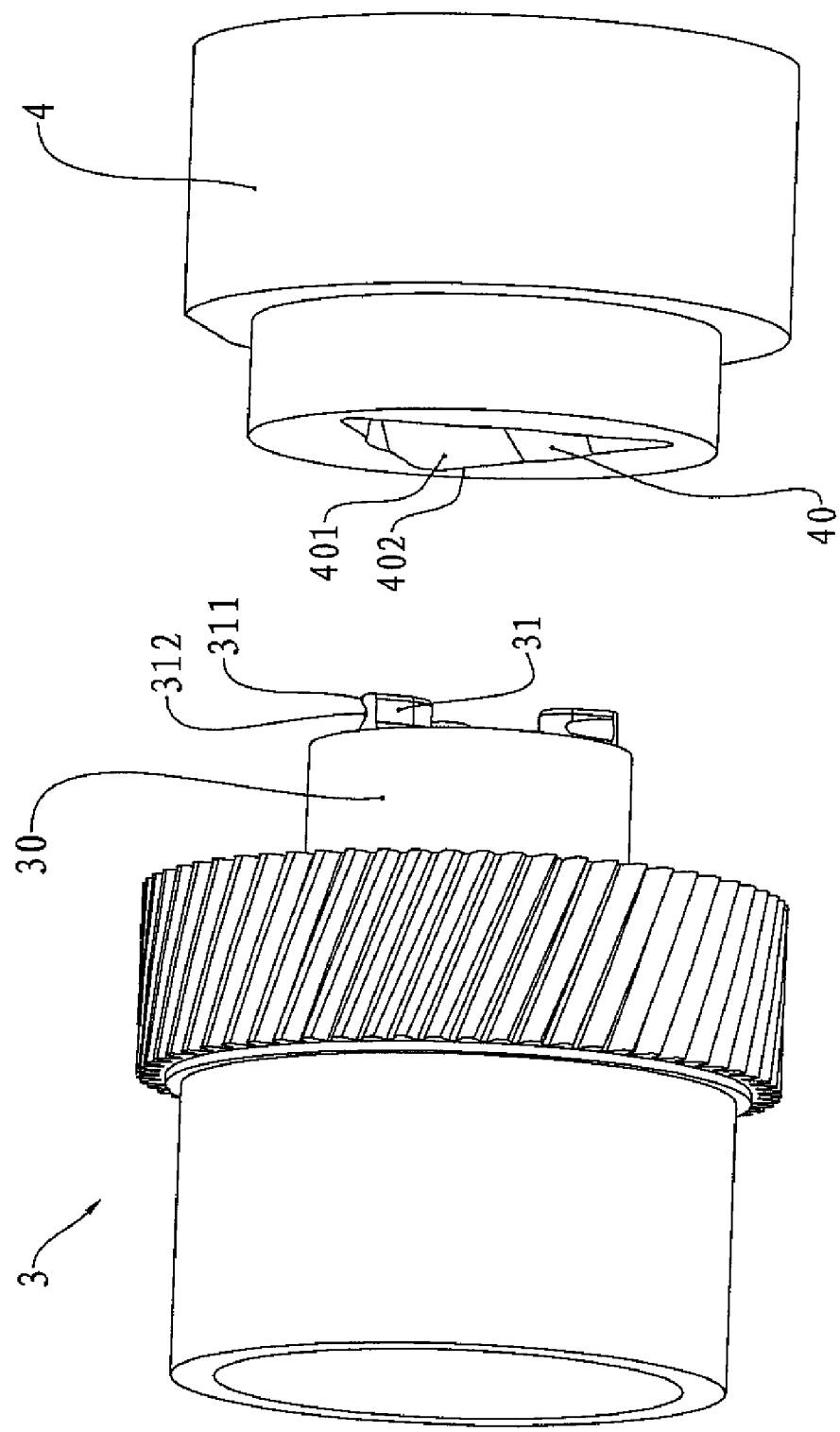
FIG. 3 is a perspective view of a driving-force transmitter and a driving part of a printer according to the first embodiment of the present invention.

The following will conduct further description on the driving-force transmitter and the process cartridge of this invention by referring to FIGS. 2 and 3.

The driving-force transmitter is such a mechanism through which the driving force is delivered from the printer to the process cartridge. The photosensitive drum shown in FIG. 2 is located in the waste toner frame 2 of the process cartridge, with one of the longitudinal ends of the photosensitive drum extending out of the side wall of the process cartridge and with the driving-force transmitter 3 provided at the longitudinal end; the driving-force transmitter 3 has a fitting part 30 of substantially cylindrical shape, by which the driving-force transmitter 3 is mounted to the photosensitive drum 10; three protrusions 31, 32 and 33 protrude from one end surface of the fitting part 30 and distributed equiangularly on a circle which is perpendicular to and concentric with the axis of the fitting part 30; the protrusion 31 has an engaging-part 311 formed by curved convex surface at the farthest end from the axis of the fitting part; an anti-separating groove 312 with two open ends is provided at the engaging-part 311 on the side close to fitting part 30; the protrusions 32 and 33 are similar to protrusion 31 in structure.

As shown in FIG. 3, the driving-force transmitter 3 transfers driving force by engaging with the driving part 4 of the printer, the engaging relationship between them and the structure of the driving part 4 of the printer will be introduced later. When the process cartridge is mounted to the printer, the driving part 4 of the printer will be engaged with the driving-force transmitter 3 of the process cartridge. An engaging hole 40 in the driving part 4 of the printer has a transverse section of substantially equilateral triangle, with the surfaces in which the sides of the triangle lie twisting about the longitudinal axis. When the driving part 4 and the driving-force transmitter 3 are in engaging condition, the protrusions 31, 32 and 33 of the driving-force transmitter 3 enter the engaging hole 40 of the driving part 4 while the edge 402 between the engaging hole 40 and the end surface of the driving part 4 is engaged with the anti-separating groove 312. Engaging condition of the protrusions 32 and 33 with the engaging hole 40 is the same as that of the protrusion 31. When driving part 4 of the printer rotates under instruction, the anti-separating groove 312 in the protrusions 31, 32 and 33 contacts the edge 402 closely, and receives driving force from the driving part 4 and delivers the driving force to the driving-force transmitter 3, and then the photosensitive drum, to rotate. Also in the course of torque delivery during rotating, because the edge 402 of the engaging hole 40 is engaged with the anti-separating groove 312 of the protrusions 31, 32 and 33, it is almost impossible for the driving-force transmitter 3 to disengage from the driving part 4 of the printer, eliminating accidental disengagement of the driving-force transmitter from the engaging hole 40 of the driving part 4 along the axial direction. In this way, printing stability is achieved.

Embodiment 2

The embodiment is another driving-force transmitter 12 according to this invention as shown in FIGS. 4 and 5, which comprises an integrally formed connection part 121, a gear 123 for transmitting driving force and a fitting part 122, the connection part 121 is substantially cylindrical and tubular by which the driving-force transmitter 12 is assembled to the end of the drum shaped tubular body of the photosensitive drum in interference fit; the fitting part 122 protrudes along the axis of the gear 123, three cylindrical protrusions 13 for receiving driving force protrude from the front end surface 124 of the fitting part 122, which are distributed equiangularly on a circle, whose center is on the axis of the fitting part 122. Each protrusion 13 is provided with an anti-separating groove 14 with an open outer end and a closed inner end on the side surface against the axis of the fitting part 122. Each groove 14 is substantially perpendicular to the axis of the fitting part 122.

Figure 6:
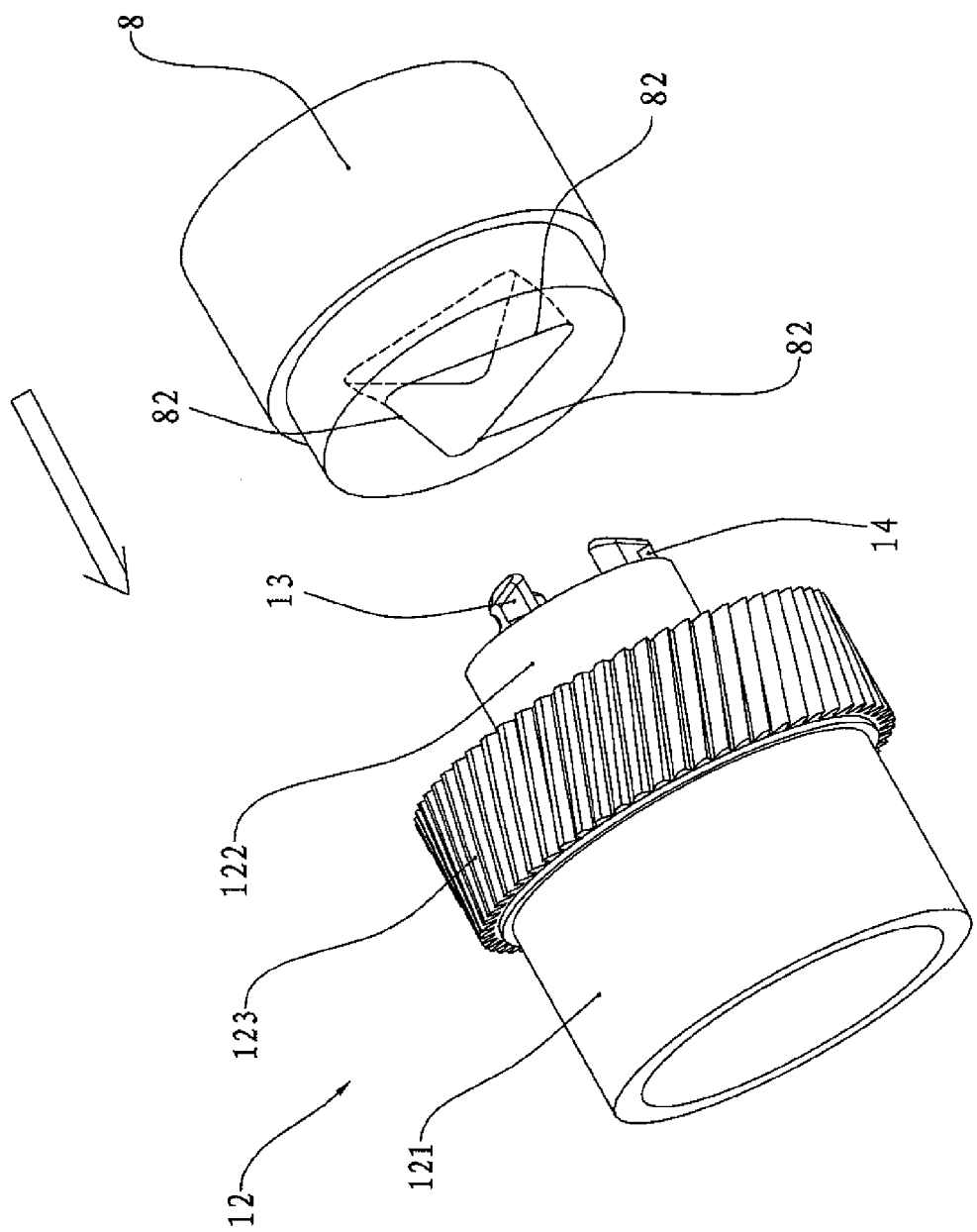
FIG. 6 is a perspective view of the driving-force transmitter and the driving part shown in FIG. 4.

As shown in FIG. 6 to FIG. 8, when the process cartridge is mounted to a printer, a driving part 8 of the printer will be engaged with the driving-force transmitter 12 of the process cartridge. The driving part 8 is provided with an engaging hole 81 whose transverse section is substantially an equilateral triangle and whose inner surfaces twist about the axis. As far as the driving part 8 is engaged with the driving-force transmitter 12, the three protrusions 13 of the driving-force transmitter 12 insert in the engaging hole 81 through the three corners of the opening of the engaging hole. Once the driving part 8 rotates under instruction, each protrusion 13, which is engaged with the edge 82 of the opening of the engaging hole 81 by its anti-separating groove 14, receives driving force from the driving part 8 to cause the driving-force transmitter 12, and then the photosensitive drum, to rotate concurrently. Because the contact between the anti-separating groove 14 and the edge 82 of the opening of the engaging hole 81 is substantially of point contact type, the stress is relatively concentrated and the transmission is more reliable. Also, during torque transfer in rotation condition, because the edge 82 of the opening of the engaging hole 81 is engaged with the anti-separating groove 14 of the protrusion 13, it becomes almost impossible for the driving-force transmitter 12 to separate from the driving part 8 of the printer, therefore, accidental disengagement of the driving-force transmitter 12 during transmission is eliminated, transmission reliability and stability as well as printing quality are improved.

In order to guarantee that the protrusions 13 of the driving-force transmitter 12 is inserted into the engaging hole 81 of the driving part 8 smoothly, the front end of each protrusion 13 is provided with a guiding surface with which the protrusions 13 can enter the engaging hole 81 of the driving part 8 more easily as the guiding surfaces are inclined relative to the axis of the fitting part 122 and makes the front end of the protrusions 13 thin. As an alternative option of embodiment, the front guiding surface of the protrusions 13 can be a curved convex surface with which, whenever the driving part 8 moves towards the protrusions 13, once the edge 82 of the opening of the engaging hole 81 touches the guiding surfaces or curve guiding surface of the protrusions 13, the protrusions can slip in along the guiding surface or curved surface. In this way, the protrusions 13 falls into the engaging hole 81 smoothly and stable engagement is obtained, product structure is simplified.

Embodiment 3

Figure 9:
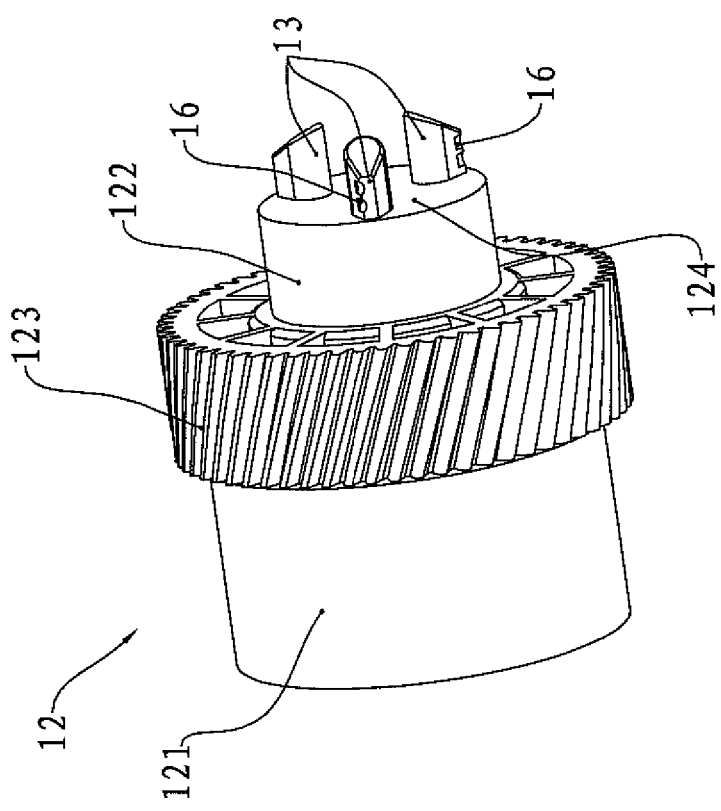
FIG. 9 is a perspective view of a driving-force transmitter according to the third embodiment of the present invention.

The embodiment is an additional embodiment of the driving-force transmitter as shown in FIG. 9, in which the driving-force transmitter 12 differs from the foregoing one in that the side surface against the axis of the fitting part, of each protrusion 13 is provided with two anti-separating grooves 16. The grooves 16 are substantially perpendicular to the axis of the gear 123, as the foregoing ones, their outer ends are open and inner ends are closed. As compared with the foregoing embodiment, the additional anti-separating groove 16 of each protrusion 13 in this embodiment will improve the flexibility of engagement between the protrusion 13 and the engaging hole 81, minimize the possibility of accidental disengagement of the driving-force transmitter 12 in transmission. The operation mode of this driving-force transmitter 12 is almost the same as the foregoing one.

Embodiment 4

Figure 10:
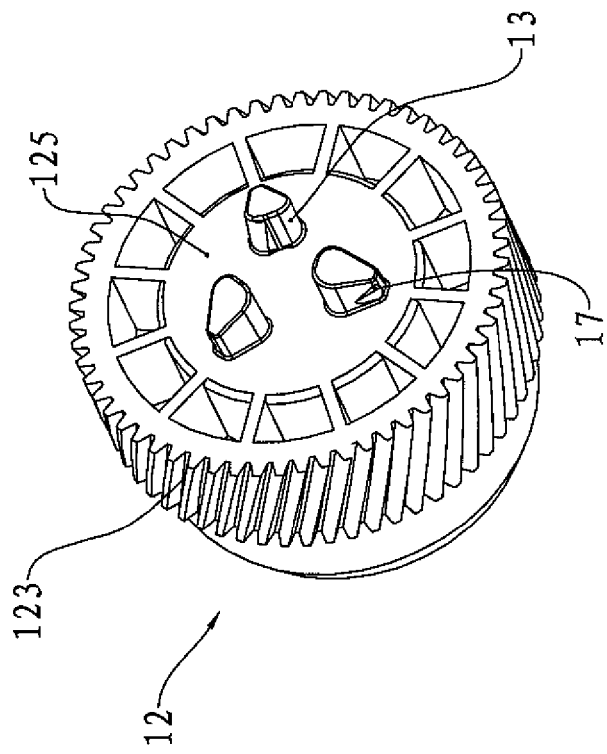
FIG. 10 is a perspective view of a driving-force transmitter according to the fourth embodiment of the present invention.

The embodiment is also an additional driving-force transmitter as shown in FIG. 10, in which there is not a fitting part protruding along the axis of the gear 123, three protrusions 13 protruding axially from the front end surface 125 of the gear 123 instead, namely, the gear 123 acts as a fitting part. The three protrusions 13 are distributed equiangularly on a circle in the front end surface 125 whose center is on the axis of the gear 123. On the side surface against the axis of the fitting part, each protrusion 13 is provided with an anti-separating groove 17 with two open ends which has the same function as the foregoing one. Also, the operation mode of this driving-force transmitter 12 is almost the same as the foregoing one.

Indeed, the inventive conception of this invention is not limited to above mentioned embodiments. Each embodiment of driving-force transmitter has a corresponding embodiment of process cartridge. In addition, engaging holes with different cross-sectional shapes, such as quadrangle or pentagon sectioned ones can be used in the driving part of the printer, and the number of the corresponding protrusions may be four or five consequently. Also, the driving-force transmitter of this invention can be used not only for transferring driving force in the process cartridge for the printer, but also in other applications for transmitting driving force. All similar minor modifications and equivalent alterations shall be considered within the scope of the following claims.

INDUSTRIAL UTILITIES

When the process cartridge is mounted to the printer, as the engaging-parts are provided with the anti-separating grooves, the edge of the opening of the engaging hole in the driving part of the printer is engaged with the anti-separating grooves, in the course of transmission, it is almost impossible for the driving-force transmitter of the process cartridge to disengage from the driving part of the printer, transmission reliability and stability as well as printing quality are further achieved.

What is claimed is:

1. A driving-force transmitter, comprising:
a fitting part;
a plurality of protrusions protruding from an end surface of said fitting part, each said protrusion having a sidewall and an end surface, and wherein said protrusions are distributed equiangularly on a circle which is in an end surface of said fitting part, the center of the circle being on the axis of said fitting part; and
an engaging-part formed by curved convex surface provided at a farthest end of each said protrusion from the axis of said fitting part,
wherein each said engaging-part has an open-ended anti-separating groove formed in said sidewall below said end surface.

2. The driving-force transmitter according to claim 1, wherein the number of said protrusions is three, connecting lines of which form a triangle.

3. A process cartridge using the driving-force transmitter according to claim 1, comprising:
a photosensitive drum located longitudinally in between side walls of said process cartridge with one of its longitudinal ends extending out of a side wall of said process cartridge,
wherein said driving-force transmitter is provided at the longitudinal end of said photosensitive drum extending out of the side wall of said process cartridge.

4. The process cartridge according to claim 3, wherein the number of said protrusions is three, connecting lines of which form a triangle.

5. A driving-force transmitter, comprising:
a fitting part revolving about its own axis; and
a plurality of protrusions protruding from an end surface of said fitting part, each said protrusion having a sidewall and an end surface,
wherein each said protrusion is provided with an anti-separating groove formed in said sidewall below said end surface against the axis of said fitting part, and
wherein each said groove is substantially perpendicular to the axis of said fitting part.

6. The driving-force transmitter according to claim 5, wherein the number of said protrusions is three, connecting lines of which form a triangle.

7. The driving-force transmitter according to claim 6, wherein the front end of each said protrusion is provided with a guiding surface.

8. The driving-force transmitter according to claim 5, wherein the front end of each said protrusion is provided with a guiding surface.

9. A process cartridge using the driving-force transmitter according to claim 5, comprising:
a photosensitive drum located longitudinally in between side walls of said process cartridge with one of its longitudinal ends extending out of a side wall of said process cartridge,
wherein said driving-force transmitter is provided at the longitudinal end of said photosensitive drum extending out of the side wall of said process cartridge.

10. The process cartridge according to claim 9, wherein the number of the protrusions is three, connecting lines of which form a triangle.

11. The process cartridge according to claim 10, wherein the front end of each said protrusion is provided with a guiding surface.

12. The process cartridge according to claim 9, wherein the front end of each said protrusion is provided with a guiding surface.

* * * * *